(Model.)
A. BRAWN.
ANIMAL TRAP.
No. 405,006. Patented June 11, 1889.
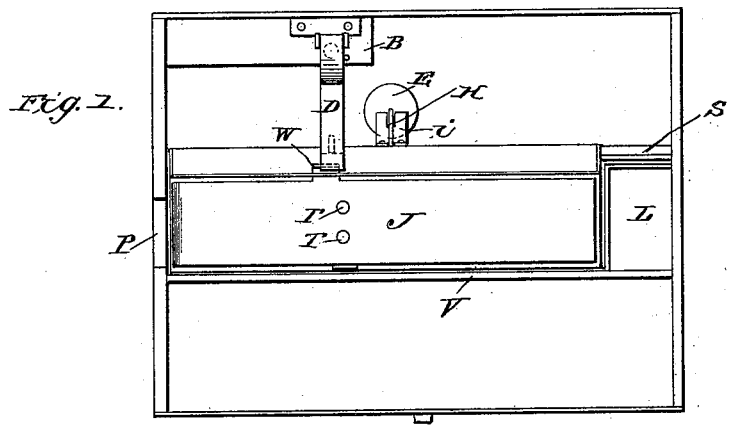
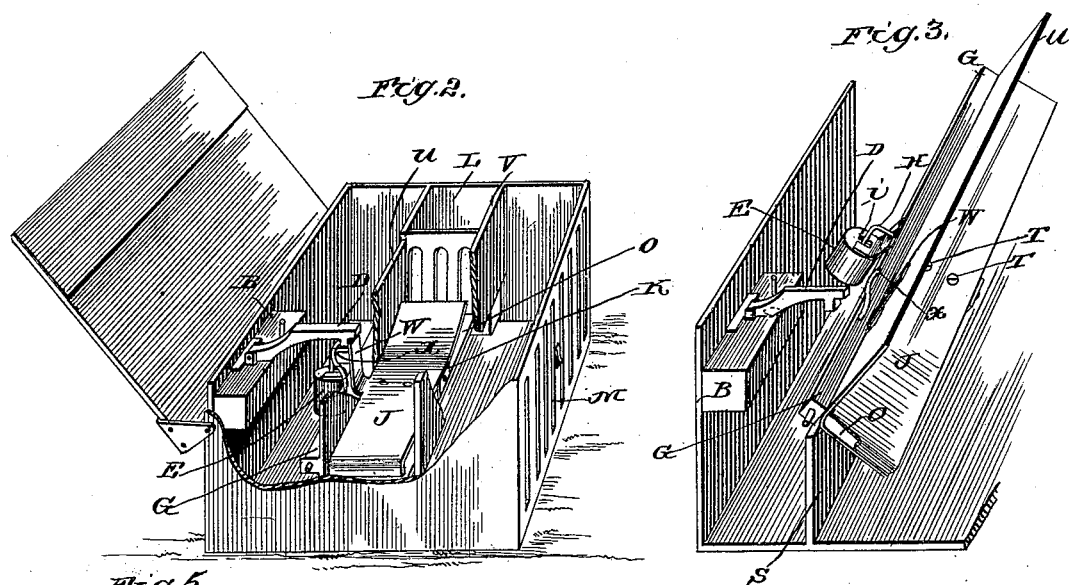
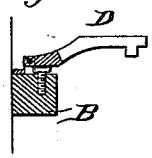
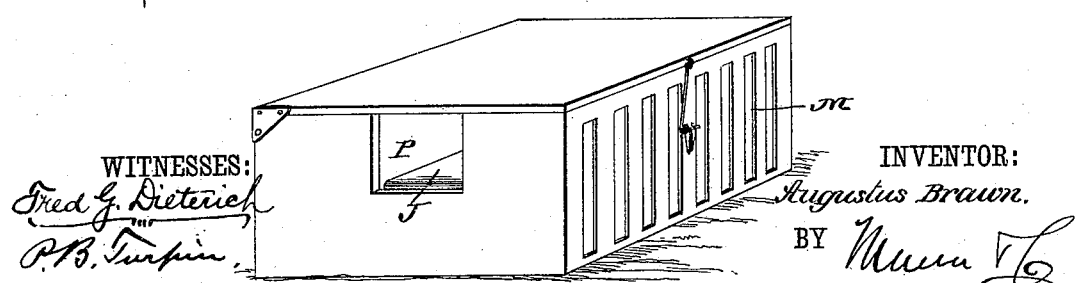
WITNESSES:
Fred G. Dieterich
P. B. Turpin
INVENTOR:
Augustus Brawn.
BY Munn
ATTORNEYS.

UNITED STATES PATENT OFFICE.

AUGUSTUS BRAWN, OF PLEASANT HILL, NEBRASKA, ASSIGNOR OF ONE-HALF TO JOHN H. DOUGE, OF SAME PLACE.

ANIMAL-TRAP.

SPECIFICATION forming part of Letters Patent No. 405,006, dated June 11, 1889.

Application filed January 24, 1888. Serial No. 261,806. (Model.)

*To all whom it may concern:*

Be it known that I, AUGUSTUS BRAWN, a citizen of the United States, and a resident of Pleasant Hill, in Saline county, State of Nebraska, have invented a new and useful Trap for Catching Mice, Rats, and other Small Animals, of which the following is a specification.

My invention consists of a rectangular box, of wood or metal, in the proportion of eight inches long by six inches wide and four inches high, with hinged cover.

The objects of my invention are, first, to secure a trap which is automatic, (self-setting,) and one in which the "dump" (dropping apparatus) is securely fastened until the mouse or other animal caught has passed so far into the trap that retreat is impossible; then the fastening of the dump is released by the weight of the animal, when the entire weight of the animal is on the dump, thus securing a sudden fall into the lower part of the box—the trap proper. The dump being so shaped that the portion which is upright when the trap is set follows the animal downward and closes the aperture and effectually prevents escape, and so remains until the dump is relieved of the weight of the animal, when the dump is suddenly righted by means of a counterpoise, and is securely latched into position automatically, all of which is shown in the accompanying drawings.

Figure 1 is a top plan view of the trap with the cover removed. Fig. 2 is a perspective view of same with the cover thrown back. Fig. 3 is a detail perspective view. Fig. 4 is a perspective view of the trap ready for use, and Fig. 5 is a detail view showing the latch and the adjusting-screw therefor.

S is a partition starting at the bottom of the box and reaching half-way to the top. To the upper edge of this partition is hinged the square bar G. To the front side of G is securely fastened the dump O U, which is bent at right angles along the line of contact with G, so that one part rises to the top of the box and completes the partition, to which G is hinged. The other portion lies in a horizontal position and reaches forward to the bottom (lower edge) of the partition V, which starts at the top of the box and extends downward to the line of the level of the top of the partition S, so that the bottom of the dump fills the space between the top of S and the bottom of V as far as the bait-box L.

To the floor of the dump is hinged a false floor J at the bolster K, to which it is secured by rivets T, and is weighted at the short end near entrance P, so as to overbalance the longer end, causing it to stand apart from the true bottom O. Attached to J is a tongue W, which passes through U and up along its outer side, as shown in Fig. 3, and is in contact with the latch D when the trap is set, as shown in Fig. 2. The counterpoise E is attached to the bar G by the bent rod H.

$i$ is a guide to hold E and H in position.

P is the opening to the trap; M, slits in front of bait-box and metal front of trap.

The operation of the trap is as follows: The animal passes into the box at P onto the weighted end of the false floor J, which rests firmly on the floor of the dump, and moves forward toward the bait at L until past the bolster K, when the long end of the false floor drops to the true floor. The tongue W, which is beveled at its upper end, moves forward, so as to bring the long part of the bevel under the latch D, which is thereby raised off the hook $x$, Figs. 2 and 3, the floor of the dump swings suddenly down and drops the animal into the bottom of the box in front of the partition S and under the partition V into the front part of the box next to the perforated front. That apartment is of metal or lined with metal. The upright side of the dump follows the animal down and closes the space behind, so as to prevent escape. As soon as the floor is relieved of the weight of the animal the dump is brought back into position by the counterpoise E, the weighted end of the false floor drops back onto the true floor, which action brings the short part of the beveled end of the tongue W under the latch D, and allows it to drop down onto $x$, and the trap is reset. The drop of the latch D is adjusted by a set-screw in the block B, to which D is hinged.

It will be seen that the floor J forms a tilting platform or tripper, by the arm or portion W of which the latch or detent D is released to permit the dump to turn and discharge the animal into the receptacle or retaining portion of the trap.

I am aware that prior to my invention dumping-traps have been made and used. I therefore do not claim all methods of dumping; but What I do claim as my invention, and desire to secure by Letters Patent, is—

1. In a trap, substantially as described, the combination of the casing or framing, the pivoted dump having side plate $u$ and bottom K, the latch supported in the casing or framing and arranged to engage and secure the dump and movable into and out of such engagement, and the platform or tripper arranged immediately above the bottom K and pivoted between its ends, such platform being provided with a rigid arm or portion arranged to engage the latch and release same from the dump when the platform is tilted, substantially as set forth.

2. The improved trap herein described, consisting of the casing having partitions S and V and bait-holder L, the dump having pivoted platform or tripper J, provided with an arm or portion W, arranged to engage the latch D, the counterpoise connected with the dump, and the latch D, all substantially as and for the purposes set forth.

3. In a trap, the combination of the casing, a dump pivoted or journaled to said casing and having a side plate $u$, and provided in a plane approximately at right angles to plate $u$, with a tilting platform pivoted between its ends, a counterpoise whereby such dump when once turned to discharge the trapped animal may be returned to its normal position, a detent engaging the dump and arranged to hold same in its normal position, and an arm or portion on the tilting platform arranged to engage the detent, all substantially as described, whereby the weight of the trapped animal may tilt the platform, release the detent, and turn the dump to dump the animal, after which the counterpoise will return the dump to normal position, substantially as set forth.

4. In a trap, substantially as described, the combination of the casing, the dump formed of side plate $u$ and base-plate K, and journaled at the juncture of plates $u$ and K to the casing, the detent whereby to secure the dump in normal position, the counterpoise connected with the dump and adapted to return it to its normal position, and the tilting platform or trip arranged directly over the plate K, pivoted between its ends to the dump, and having an arm or portion by which to engage and release the detent, all substantially as and for the purposes specified.

AUGUSTUS BRAWN.

In presence of—
E. S. ABBOTT,
L. S. ABBOTT.